United States Patent [19]

Yoda et al.

[11] 4,352,859

[45] Oct. 5, 1982

[54] MAGNETIC RECORDING MEDIUM

[75] Inventors: Kuniichi Yoda; Takehisa Ohkawa; Hitoshi Azegami, all of Tokyo, Japan

[73] Assignee: TDK Electronics Co., Ltd., Tokyo, Japan

[21] Appl. No.: 285,288

[22] Filed: Jul. 20, 1981

[30] Foreign Application Priority Data

Jul. 31, 1980 [JP] Japan ................................. 55-104392

[51] Int. Cl.³ ............................................ B32B 27/30
[52] U.S. Cl. ............................ 428/425.9; 252/62.54; 428/480; 428/522; 428/694; 428/900
[58] Field of Search .................... 428/900, 480, 425.9, 428/522, 694; 427/128, 48; 252/62.54

[56] References Cited

U.S. PATENT DOCUMENTS 4,152,485  5/1979  Mizumura et al. ................. 427/128
4,256,852  3/1981  Naruse et al. ....................... 427/128

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer comprising a magnetic powder and a binder comprising an urethane resin or a polyester and a vinyl chloride type copolymer of vinyl chloride-vinyl acetate-vinyl alcohol copolymer, vinyl chloride-vinyl acetate-maleic acid copolymer or vinyl chloride-vinylidene chloride copolymer having a polymerization degree of up to 300.

6 Claims, 2 Drawing Figures

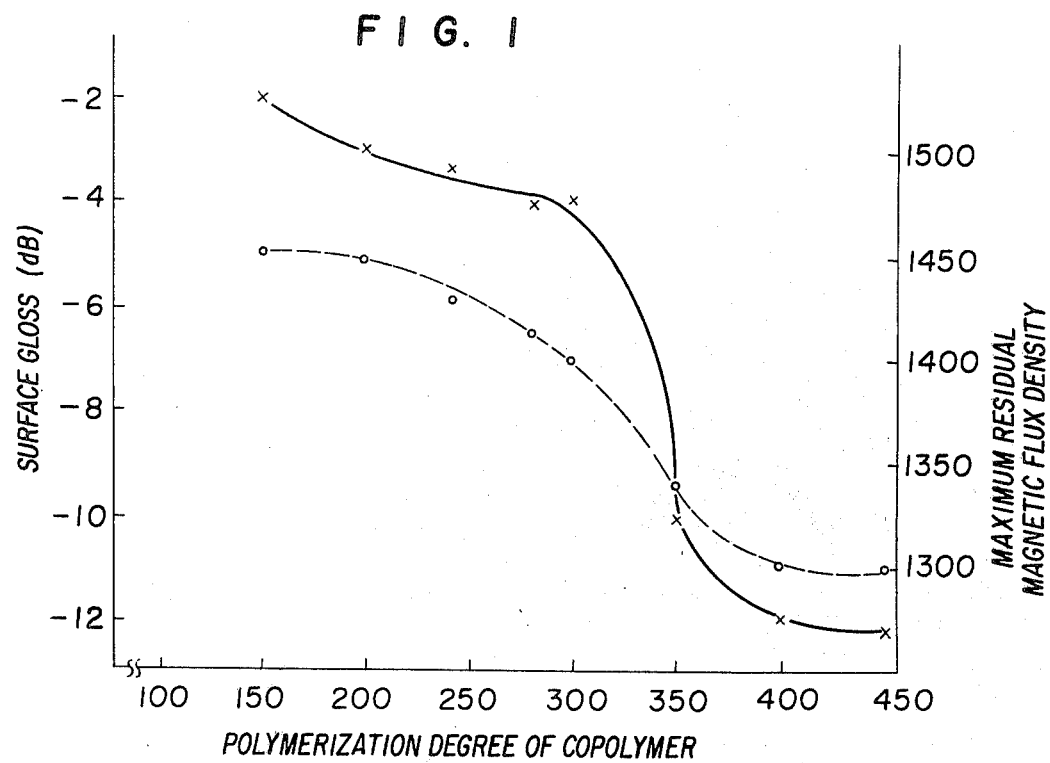
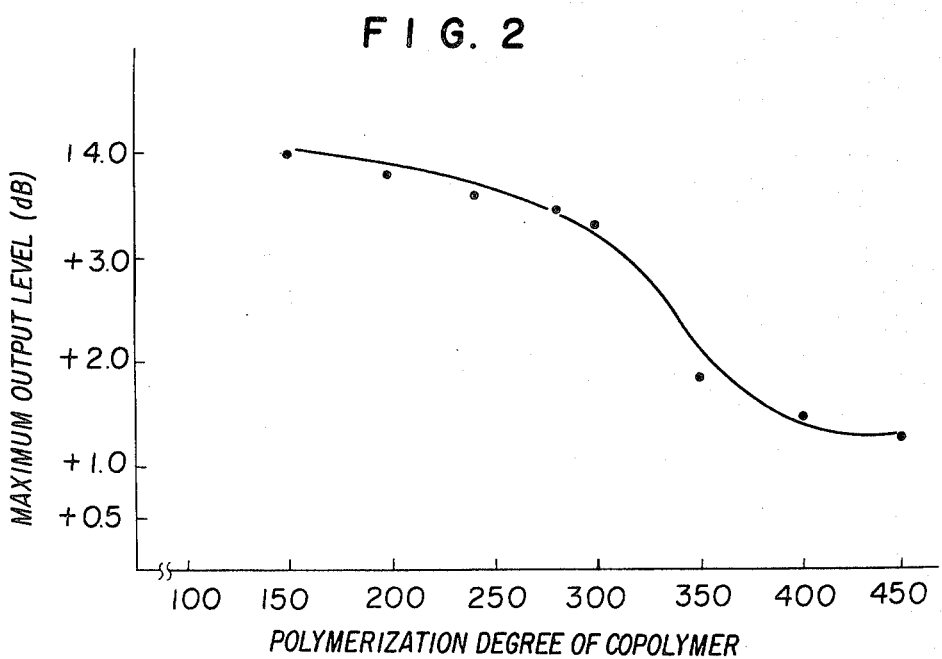

MAGNETIC RECORDING MEDIUM

BACKGROUND OF THE INVENTION

1. Field of the Invention

The present invention relates to a magnetic recording medium having excellent surface property and maximum residual magnetic flux density. More particularly, it relates to a magnetic recording medium comprising vinyl chloride-vinyl acetate-vinyl alcohol copolymer, vinyl chloride-vinyl acetate-maleic acid copolymer or vinyl chloride-vinylidene chloride copolymer having up to 300 of polymerization degree as a component of a binder for a magnetic layer.

2. Description of the Prior Arts

The magnetic recording media such as magnetic tapes and magnetic cards are usually prepared by forming a magnetic layer on a substrate such as a film made of polyvinyl chloride, polyester or polycarbonate by bonding a magnetic powder such as $\gamma\text{-}Fe_2O_3$ with a binder. Various magnetic recording media have been proposed.

Recently, higher characteristics as improvement of electromagnetic convertible characteristic and high recording density have been further required depending upon an increase of fields of usages of such magnetic recording media. Certain vinyl chloride type copolymers have been used as the binder for this purpose. These copolymers have a polymerization degree of about 350 to 450. In the magnetic powder compositions comprising such copolymer, a content of the binder for an optimum printability is in a range of about 7.0 to 12%. Thus, a content of a solvent in the magnetic powder composition containing a magnetic powder is in a range of about 59.5 to 72.7%. Such high content of the solvent in the magnetic powder composition is disadvantageous in view of improvement of a surface property and a maximum residual magnetic flux density of the magnetic recording medium.

SUMMARY OF THE INVENTION

It is an object of the present invention to provide a magnetic recording medium having excellent surface property and maximum residual magnetic flux density.

The foregoing and other objects of the present invention have been attained by providing a magnetic recording medium which comprises a substrate coated with a magnetic layer comprising a magnetic powder and a binder comprising an urethane resin or a polyester and a vinyl chloride type copolymer of vinyl chloride-vinyl acetate-vinyl alcohol copolymer, vinyl choride-vinyl acetate-maleic acid copolymer or vinyl chloride-vinylidene chloride copolymer having a polymerization degree of up to 300.

BRIEF DESCRIPTION OF THE DRAWINGS

FIGS. 1 and 2 are respectively graphs showing characteristics of gloss and maximum residual magnetic flux of the conventional magnetic recording medium and the magnetic recording medium of the present invention.

DETAILED DESCRIPTION OF THE PREFERRED EMBODIMENTS

It has been studied to reduce a content of a solvent in a magnetic powder composition containing vinyl chloride type copolymer as a binder under maintaining the optimum printability. As a result, it has been found that when a vinyl chloride type copolymer having a polymerization degree of upto 300 is used, the content of the solvent in the magnetic powder composition can be reduced whereby the surface property and the maximum residual magnetic flux density of the magnetic recording medium are improved. These effects increase depending upon lowering of the polymerization degree. In view of a running property and a temperature-humidity characteristic, the lower limit of the polymerization degree is at least 200. It has been also found that when a vinyl chloride type copolymer having functional groups and a polymerization degree of upto 200 can be used by crosslinking with a polyisocyanate whereby the surface property and the maximum residual magnetic flux density can be improved without any adverse effect for the running property.

The present invention has been attained by the finding.

In one embodiment of the present invention, a magnetic recording medium is prepared by forming a magnetic layer on a substrate by bonding a magnetic powder with a binder comprising an urethane resin such as urethane elastomer or prepolymer and a vinyl chloride type copolymer such as a vinyl chloride-vinyl acetate-vinyl alcohol copolymer, vinyl chloride-vinyl acetate-maleic acid copolymer, a vinyl chloride-vinylidene chloride copolymer which has a polymerization degree of upto 300. In the other embodiment, a magnetic recording medium is prepared by forming a magnetic layer on a substrate by bonding a magnetic powder with a binder comprising said urethane resin and said vinyl chloride type copolymer together with a polyisocyanate.

In the present invention, it is important to use the vinyl chloride type copolymer having a polymerization degree of upto 300. When the polymerization degree is more than 300, the surface gloss of the magnetic layer is inferior and the maximum residual magnetic flux density is inferior. On the other hand, the effects of the improvement of the surface gloss and the maximum residual magnetic flux density are increased depending upon reduction of polymerization degree lower than 300. Thus, the maximum output level is improved. On the other hand, when the polymerization degree is lower than 200, the running property and temperature-humidity characteristic as reliability characteristics are inferior. In such case, the reliability characteristics can be improved by crosslinking with a polyisocyanate to increase the polymerization degree.

An amount of the vinyl chloride type copolymer having a polymerization degree of upto 300 used in the present invention is in a range of 20 to 90% preferably 40 to 80% based on the total components of the binder.

The vinyl chloride-vinyl acetate-vinyl alcohol copolymer preferably comprises 20 to 95% of vinyl chloride component and 80 to 5% of vinyl acetate and vinyl alcohol components. The ratio of vinyl acetate component to vinyl alcohol component can be 5:95 to 95:5 by weight, preferably 10:90 to 90:10 by weight.

The vinyl chloride-vinyl acetate-maleic acid copolymer preferably comprises 20 to 95% of vinyl chloride component, 80 to 5% of vinyl acetate component and 1.5 to 5.0% of maleic acid component.

The urethane resins combined with the vinyl chloride type copolymer include high molecular weight urethane elastomers having no free isocyanate group and low molecular weight urethane prepolymers having free isocyanate groups. In the present invention, commercially available urethane resins can be effectively used. The typical commercial urethane resins include "Nippolan 2304," "Nippolan 3022," "Nippolan 5032," "Nippolan 5033" and "Paraplen22S, manufactured by Nippon Polyurethane Co. and "Esten 5732," "Esten 5703," "Esten 5711," "Esten 5712" and "Esten5715" manufactured by B. F. Goodrich Co. "CRISBON 4216," "CRISBON 4407)," and "CRISBON 7209" manufactured by Dainippon Ink and Color Co.

The typical commercial urethane prepolymers include "Colonate 4080," "Colonate 4090" and "Colonate 4095," manufactured by Nippon Polyurethane Co. and "Takenate L-1007" and "Takenate L-1006" manufactured by Takeda Yakuhin Kogyo Co.

In the present invention, when a polyisocyanate is incorporated in the binder to use a thermosettable binder, the polyisocyanate is preferably added at a ratio of 5 to 30% especially 10 to 25% based on the total of the resins to crosslink them. The typical commercial polyisocyanates include "Colonate L," "Colonate HL" and "Colonate 2036" manufactured by Nippon Polyurethane Co.

The magnetic powders, the additives and the substrates are described in many patents and patent applications filed by the applicant. The descriptions of these details are referred in the understanding of the present invention.

The present invention will be further illustrated by certain examples and references which are provided for purposes of illustration only and are not intended to be limiting the present invention.

EXAMPLE 1

| | |
|---|---|
| Magnetic powder ($\gamma$-Fe$_2$O$_3$): | 120 to 200 g. |
| Vinyl chloride-vinyl acetate-maleic acid copolymer: | 24 to 36 g. |
| (Content of maleic acid component) | |
| (of 2%; polymerization degree of 450,) | |
| (400, 300, 280, 240, 200, 150.) | |
| Urethane resin: | 4 to 16 g. |
| (Urethane prepolymer or elastomer) | |
| Dispersing agent: | 1.2 to 7 g. |
| Additive: | 0.4 to 4 g. |

EXAMPLE 2

| | |
|---|---|
| Magnetic powder ($\gamma$-Fe$_2$O$_3$): | 120 to 200 g. |
| Vinyl chloride-vinyl acetate-maleic acid copolymer: | 24 to 36 g. |
| (Content of maleic acid component of) | |
| (2%; polymerization degree of 450, 400,) | |
| (300, 280, 240, 200, 150.) | |
| Urethane resin: | 4 to 16 g. |
| (Urethane prepolymer or elastomer) | |
| Polyisocyanate: | 4 to 10 g. |
| Dispersing agent: | 1.2 to 7 g. |
| Additive: | 0.4 to 4 g. |

EXAMPLE 3

| | |
|---|---|
| Magnetic powder ($\gamma$-Fe$_2$O$_3$): | 120 to 200 g. |
| Vinyl chloride-vinyl acetate-vinyl alcohol copolymer: | 12 to 28 g. |
| (Content of vinyl alcohol component) | |
| (of 11.5% polymerization degree of 450,) | |
| (400, 300, 280, 240, 200, 150) | |
| Urethane prepolymer: | 28 to 12 g. |
| Dispersing agent: | 0 to 7 g. |
| Additive: | 0 to 2 g. |

EXAMPLE 4

| | |
|---|---|
| Magnetic powder (Co-adsorbed $\gamma$-Fe$_2$O$_3$): | 120 to 200 g. |
| Vinyl chloride-vinyl acetate-maleic acid copolymer: | 12 to 28 g. |
| (Content of maleic acid component) | |
| (of 2%; polymerization degree of 450,) | |
| (400, 300, 280, 240, 200, 150) | |
| Polyester: | 12 to 28 g. |
| Polyisocyanate: | 4 to 7 g. |
| Dispersing agent: | 0 to 7 g. |
| Additive: | 0 to 2 g. |

Each magnetic powder composition was prepared by using the components as the formulations of Examples and was coated on a substrate to prepare each magnetic recording medium.

The characteristics of the samples of Example 1 are shown in FIG. 1, wherein the full line shows the surface glosses and the dotted line shows the maximum residual magnetic flux densities.

As it is found in FIG. 1, the surface gloss of the coated magnetic layer is improved and the maximum residual magnetic flux density is improved depending upon reduction of the polymerization degree.

FIG. 2 is the graph showing the relation of the maximum output levels and the polymerization degree of the vinyl chloride-vinyl acetate-vinyl alcohol copolymer. The maximum output level is improved by using the copolymer having a polymerization degree of less than 300.

In Example 2, the polyisocyanate is incorporated in the magnetic powder composition. The reliability characteristics such as running property are inferior by using the copolymer having a polymerization degree of less than 200. Thus, the reliability characteristics are improved by crosslinking them with the polyisocyanate to increase the polymerization degree.

In the examples, $\gamma$-Fe$_2$O$_3$ or Co-adsorbed $\gamma$-Fe$_2$O$_3$ was used as the magnetic powder. Fe$_3$O$_4$ or Co-adsorbed Fe$_3$O$_4$ can be used as the magnetic powder instead of the above-mentioned magnetic powder.

The additives can be the conventional additives such as fatty acids (myristic acid, palmitic acid, stearic acid, behenic acid), silicone oil (dimethyl siloxane) and antistatic agents (metallic soaps and quaternary ammonium salts). The dispersing agents can be the conventional ones such as fatty acid esters, phosphoric acid esters and higher alcohols.

We claim:

1. A magnetic recording medium which comprises a substrate coated with a magnetic layer comprising a magnetic powder and a binder comprising an urethane resin or a polyester and a vinyl chloride type copolymer of vinyl chloride-vinyl acetate-vinyl alcohol copolymer, vinyl chloride-vinyl acetate-maleic acid copolymer or vinyl chloride-vinylidene chloride copolymer having a polymerization degree of less than 300.

2. The magnetic recording medium according to claim 1 wherein said urethane resin is an urethane elastomer.

3. The magnetic recording medium according to claim 1 wherein said urethane resin is an urethane prepolymer.

4. The magnetic recording medium according to claim 1, 2 or 3 wherein said binder further comprises a polyisocyanate.

5. The magnetic recording medium according to claim 1 wherein said vinyl chloride type copolymer is vinyl chloride-vinyl acetate-maleic acid copolymer comprising 20 to 95% of vinyl chloride component, 80 to 5% of vinyl acetate component and 1.5 to 5.0% of maleic acid component and a polymerization degree of less than 300.

6. The magnetic recording medium according to claim 1 wherein said vinyl chloride type copolymer is incorporated at a ratio of 20 to 90% based on said binder.

* * * * *